Figure 1:
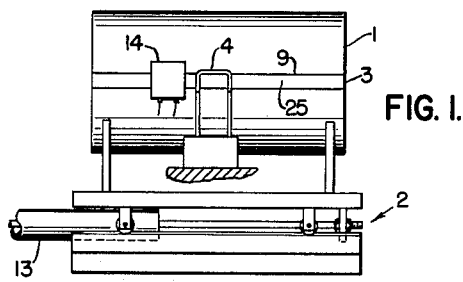

Feb. 13, 1962  A. J. SIELICKI  3,020,745
METHOD OF FLAW DETECTION IN A METAL MEMBER
Filed Nov. 13, 1958

INVENTOR.
ALEXANDER J. SIELICKI
BY
*Andrus & Starke*
Attorneys

United States Patent Office 3,020,745
Patented Feb. 13, 1962

3,020,745
METHOD OF FLAW DETECTION IN A METAL MEMBER
Alexander J. Sielicki, Thiensville, Wis., assignor to A. O. Smith Corporation, Milwaukee, Wis., a corporation of New York
Filed Nov. 13, 1958, Ser. No. 773,602
6 Claims. (Cl. 73—15)

This invention relates to a method for detecting flaws in an electrically heated metal member and is particularly directed to a method employing an infrared energy detector responsive to heat concentrations adjacent a defect in the member.

Non-destructive testing of metal members is presently finding increased application in the art of metal fabrication. A particularly successful method of detecting surface and subsurface flaws is disclosed in the copending application of Eugene J. Limpel, Serial No. 740,127, which was filed June 19, 1958, entitled "Non-destructive Testing of Metal Members" and which is assigned to a common assignee herewith. The disclosure therein is specifically applied to a flash welded pipe. The area to be inspected is heated by induced eddy currents which uniformly increase the temperature of the pipe in the absence of defects. At a defect the induced current is concentrated about the edge or at the corners of the defect and a hot spot develops which may be detected in any suitable manner.

The infrared energy emitted from a body is a function of the temperature of the body and therefore an infrared detector may be employed in the preceding detection system to respond to the change in the infrared energy emitted when adjacent a defect. However, because the energy change is small, an extremely sensitive infrared detector must be employed and is primarily a laboratory type unit.

The infrared energy emitted is also a function of the emissivity constant of the radiating body. The emissivity constant is determined by the surface condition of the body. A black surface has a high constant whereas a shiny surface has a very low constant. Consequently, known infrared detecting unit cannot practically be used for the flash welded surfaces which have had the flash removed by scraping and the like due to the resulting shiny surface.

Further, the irregularity in the color of the weld surface of a flash welded pipe or the like prevents accurate inspection with the conventional sensitive infrared unit. The changes in the output of the infrared detecting unit arising from defects is obscured by the changes in the color of the weld surface.

In accordance with the present invention, the surface to be inspected is covered with a thin, homogeneous coating of a high emissivity material. The surface is then heated electrically to establish a heat pattern wherein the defects appear as localized heat concentrations. The coating establishes a uniform colored surface and increases the infrared energy emitted from the surface being inspected. By employing a coating material having a uniform color composition, changes in the emitted infrared energy are essentially solely determined by defects in the member and the higher signal output provides a readily discernible defect-determined energy pattern.

The drawing furnished herewith illustrates the best mode presently contemplated for carrying out the invention.

Figure 2:
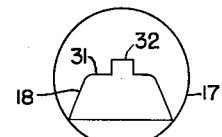
Figure 2:
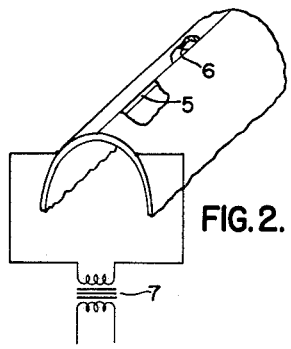
Figure 4:
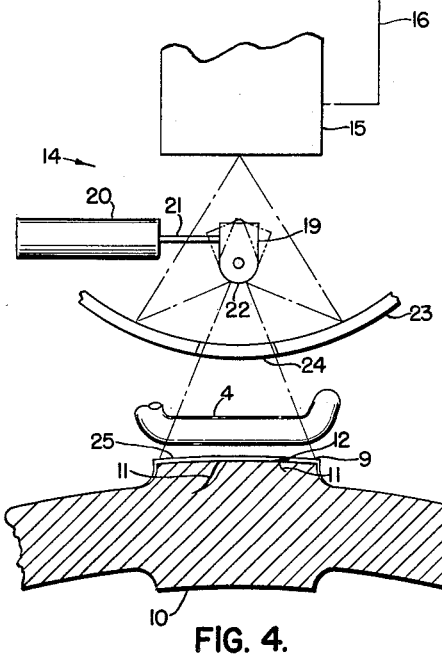
Figure 3:
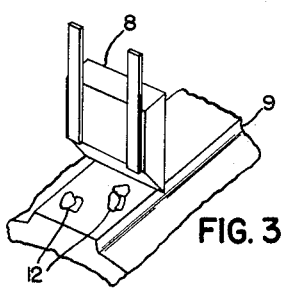
Figure 5:
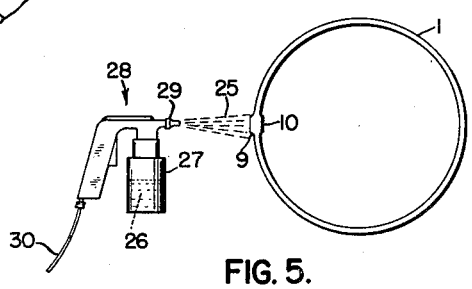

In the drawing:
FIGURE 1 is an elevational view of a pipe supported for inspection;
FIG. 2 is a diagrammatic showing of flash welding a pipe;
FIG. 3 is a diagrammatic showing of flash removing from a flash welded pipe;

FIG. 4 is an enlarged view, partly in section, of a diagrammatically illustrated infrared detecting unit operatively associated with the pipe of FIG. 1; and
FIG. 5 is a diagrammatic illustration of a method of coating the surface to be inspected.

Referring to the drawing and particularly to FIG. 1, a length of tubular pipe 1 is movably supported by a carriage 2. The illustrated pipe 1 is a conventionally flash welded pipe having a longitudinal seam weld 3. The pipe 1 is arranged on the carriage 2 to dispose the weld 3 in a horizontal plane passing through the axis of the pipe. A stationary induction heating coil 4 is supported in radially slightly spaced and aligned relation to the weld 3. The pipe 1 is progressively moved past the coil 4 which induces a radio frequency current in the weld 3 to successively heat the outer portion of the weld.

The tubular pipe 1 is conventionally formed by rolling a flat metal sheet, not shown, into a tubular shaped member having opposed edges 5 and 6, as shown in FIG. 2. Opposing forces are applied to the edges 5 and 6 by any suitable means, not shown, to first maintain the complete length of the opposed edges in relative light touching relation.

A transformer 7 is connected across the touching edges 5 and 6 to establish current flow from one edge to the other. The lightly touching edges 5 and 6 constitute a high resistance to the current flow which results in generation of heat within the edges. The generated heat increases the temperature of the edges to a pressure welding temperature.

After a predetermined period of heating, the force applied to the heated edges 5 and 6 is suddenly increased to rapidly and firmly force the edges into upsetting engagement to form the longitudinal weld 3.

Referring to FIG. 3, a scraper 8 is conventionally pulled across the surface of the weld 3 immediately following the welding process to remove excess flash and the like and provide a finished weld surface.

The initial metal sheet, not shown, from which the the pipe 1 is formed often includes small flattened gas pockets, slag inclusions or the like which constitute laminated portions within the metal sheet.

In the flash welding process, the edges 5 and 6 of the pipe 1 bend radially inwardly and outwardly forming outer and inner ridges or raised weld surfaces 9 and 10, respectively, as most clearly shown in FIG. 4. Outbent laminations or voids 11 result at the locations of the gas pockets or slag inclusions in the weld area as shown greatly exaggerated for clarity of illustration in FIG. 4.

When the scraper 8 is pulled over the weld surface, a thin layer of surface metal 12 may be pulled over a void 11 and superficially establish a subsurface void, as shown in FIG. 4.

In pipe for transporting oil and the like, relatively minute surface cracks or voids 11 in the weld 3 require rejection of the pipe unless corrected by rewelding and the like. The customer requires 100% inspection of each and every weld of each and every pipe during the production of the pipe. The testing method employed must be reliable and accurate. Economically, the method must be sufficiently rapid for correlation and introduction into pipe production line, not shown.

In accordance with the illustrated embodiment of the invention, the surface area of weld 3 is rapidly tested to locate the laminations or voids 11 by moving the pipe past the induction heating coil 4.

A fluid motor 13 is secured to the movable carriage 2 and effects a complete and rapid movement of the longitudinal weld 3 relative to the heating coil 4.

As the longitudinal weld 3 moves past the heating coil 4, eddy currents, not shown, are established in successive areas of the weld 3 and increase the temperature of the outer portion of weld 3. Any surface and subsurface defect 11 which is present in the weld results in a concentration of eddy currents adjacent the defect.

An infrared heat detecting unit 14 is mounted adjacent the trailing portion of the induction heating 4 to successively scan the heated weld 3. The heat energy emitted by weld 3 includes infrared energy which is a direct function of the temperature. The detection unit 14 is responsive to the infrared energy to locate defects 11.

Referring particularly to FIG. 4, the detecting unit 14 is diagrammatically shown including an infrared responsive device 15 having an electrical output lead 16 connected to the input of an oscilloscope 17. A signal trace 18 appears on the screen of the oscilloscope in accordance with the input signals to the device 15 which are established by the energy emitted from weld surface 3.

A small mirror 19 is pivotally mounted in spaced relation to the weld surface 9 about an axis parallel to the weld to pick up the infrared energy emitted from the weld surface 9. The mirror 19 is connected to a vibrator 20 by any suitable coupling 21 and is rapidly pivoted about the pivot axis. Consequently, as the pipe 1 moves past the detecting unit 14, the weld facing surface 22 of the mirror 19 continuously scans the adjacent weld surface as a series of small, line-like areas. An energy concentrating reflector 23 is interposed between the mirror 19 and the weld surface 9 and has a small central opening 24 through which mirror 19 scans the weld 3. The mirror 19 is so located with respect to the reflector 23 and the opening 24 that the width of weld surface 9 is completely scanned for each vibration of the mirror 19.

The infrared responsive device 15 is located in spaced relation to the back of the reflector 23 such that energy waves striking the facing surface of the reflector are concentrated on to the infrared responsive device 15.

In accordance with the present invention, the weld surface 9 to be inspected is covered with a film or coating 25 of a high emissivity material having a uniform color. Black material is very highly emissive and consequently lamp black, powdered carbon or powdered graphite are extremely satisfactory. The coating 25 increases the energy emitted and greatly increases the sensitivity, accuracy and speed of the flaw detection process. The coating 25 is preferably in the form of a thin, homogeneous film completely overlying the weld surface to be inspected.

Referring particularly to FIG. 5, the coating 25 is applied by spraying a solution of the material and a suitable solvent upon the weld surface 9. The solvent and material solution 26 is supported within a suitable reservoir 27 of a spray gun 28. A suitable source of air or the like, not shown, is connected to the nozzle portion 29 of spray gun 28 by a conduit 30. The reservoir 27 is connected to nozzle 29 and includes a siphon mechanism, not shown, to siphon a predetermined quantity of the solution 26 from the reservoir 27 and discharge the solution incident to the flow of air through the nozzle portion 29. The spraying of the coating 25 onto the weld surface 9 establishes a thin, uniform film overlying the weld surface.

The functioning of the illustrated inspection apparatus is summarized as follows:

The induction coil 4 successively heats the weld surface 9 and wherever a defect 11 is encountered, a small concentration of heat results. The infrared energy which is emitted from the weld surface 9 is directly proportional to the temperature and to the color of the weld surface.

The emitted energy from the weld 3 is relatively low particularly because of the shiny surface resulting from the action of cutter 8. However, the thin film or coating 25 amplifies the emitted infrared energy to suitable levels and the difference or increase in temperature at a defect 11 may be readily discerned. Further, the coating 25 establishes a uniform colored surface and the infrared energy emitted from the surface is proportional essentially only to changes in the temperature of the surface.

The emitted infrared energy waves are directed onto mirror 19 as it scans the weld surface 9 and are reflected by the mirror surface 22 to the reflector 23. The reflector 23 reflects and concentrates the infrared energy onto the infrared sensitive device 15. The electrical output from the device 15 is a direct function of the received infrared energy.

If there are no defects in the weld surface 9, the infrared energy emitted is constant and the output of the infrared detector 15 correspondingly remains constant as the detector unit 14 traverses the weld 3. The detector output appears on the oscilloscope 17 as a relatively constant horizontal line 31.

However, a heat concentration or hot spot increases the infrared energy emitted from the weld surface 9. Accordingly, the output of the infrared sensitive device 15 is proportionally increased. The increase appears in the trace 18 on oscilloscope 17 as a sharp rise in the signal level as at 32 incident to the relative movement of the detector 14 past the portion of weld 3 containing the defect.

The infrared detection system scans the area as a series of narrow lines such that the increased temperature adjacent a defect is an appreciable amount of the total energy in any one particular line. In this manner, relatively minute defects can be detected.

The infrared sensitive device 15 readily responds to the level of the emitted infrared energy established by the use of the coating. The process therefore allows rapid relative movement of the detector and the surface to be inspected to quickly view the weld surface. The infrared flaw detection system of the present invention is therefore adapted for production line inspection of welded pipe and the like.

The infrared unit may be incorporated into a suitable marking or recording device, not shown, to automatically and permanently record the locatiton of a defect or to directly mark the location of the defect on the inspected surface.

The present invention provides a rapid and reliable infrared flaw detection method for metallic members and is particularly adapted for inspection of flashed welded members and the like.

Various modes of carrying out the invention are contemplated as being within the scope of the following claims particularly pointing out and distinctly claiming the subject matter which is regarded as the invention.

I claim:

1. In the method of detecting flaws in a metal member by electrically heating the member to establish a temperature pattern having hot spots adjacent the defect and traversing the surface with an infrared sensitive device to detect the hot spots, the improvement which comprises covering the surface to be inspected with a high emissivity material to amplify the emission of the infrared energy from the surface.

2. In the method of detecting flaws in a metal member by electrically heating the member to establish a temperature pattern having hot spots adjacent the defect and traversing the surface with an infrared sensitive device to detect the hot spots, the improvement which comprises covering the surface to be inspected with a high emissivity material having a uniform color composition to amplify the emission of the infrared energy from the surface and to establish an infrared energy output essentially solely determined by the temperature of the underlying metal member.

3. The method of locating flaws in a preselected area of a metal member, which comprises coating the preselected area to be inspected with a finely divided high emissivity material, establishing a high frequency heating current flow in the preselected area of the metal member to increase the temperature of the metal member, said current flow establishing a substantially uniform temperature pattern having hot spots adjacent the defects, and traversing the preselected area of the metal member in the presence of the temperature pattern with an infrared responsive device to locate said hot spots and the adjacent defects.

4. The method of locating flaws in a preselected area of a metal member, which comprises spraying the preselected area to be inspected with a solution of a solvent and a finely divided black material to establish a high emissivity film overlying the preselected area of the metal member, establishing heating current flow in the preselected area of the metal member to increase the temperature of the metal member, said current flow establishing a substantially uniform temperature pattern having hot spots adjacent the defects, and traversing the preselected area of the metal member while said temperature pattern is present with an infrared responsive device to locate said hot spots and the adjacent defects.

5. In the method of detecting flaws in the weld of a flash welded metal member having the flash removed by a scraping operation, establishing a current flow in the weld to increase the surface area of the weld to a generally uniform temperature pattern having hot spots adjacent the defect, coating the surface with a film of high emissivity material, and traversing the surface with an infrared responsive device to detect said hot spots.

6. The method of locating flaws in a flash weld from which the flash has been removed by scraping, which comprises spraying the surface of the flash weld with a solution of a solvent and a finely divided material selected from the group consisting of lamp black, powdered carbon and powdered graphite to establish a black film overlying the flash weld, establishing a heating current flow through the flash weld to create a substantially uniform temperature pattern having hot spots adjacent defects in the flash weld, and traversing the surface of the flash weld with an infrared responsive device to locate the hot spots and the adjacent defects.

References Cited in the file of this patent
UNITED STATES PATENTS

| | | |
|---|---|---|
| 2,222,425 | Wehe | Nov. 19, 1940 |
| 2,587,705 | De Forest | Mar. 4, 1952 |
| 2,649,500 | Fedorchak | Aug. 18, 1953 |
| 2,880,309 | Gallagher et al. | Mar. 31, 1959 |

OTHER REFERENCES

Physics: A text by Hausmann and Slack, D. Van Nostrand Co., N.Y., 1935 (pages 368 and 369). (A copy is available in Div. 36.)

Temperature: A text by the American Institute of Physics, Reinhold Publishing Corp., N.Y., 1941 (pages 1164–1168). (A copy is available in Div. 36.)